United States Patent
Wu et al.

(10) Patent No.: US 6,432,562 B1
(45) Date of Patent: Aug. 13, 2002

(54) MAGNETIC RECORDING MEDIUM WITH A NIALRU SEEDLAYER

(75) Inventors: Stella Z. Wu, Fremont; Qixu Chen, Milpitas; Samuel D. Harkness, IV, San Francisco; Rajiv Y. Ranjan, San Jose, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/393,328

(22) Filed: Sep. 10, 1999

Related U.S. Application Data

(60) Provisional application No. 60/101,902, filed on Sep. 25, 1998.

(51) Int. Cl.[7] .............................. G11B 5/66; G11B 5/70; B05D 5/12; C23C 14/34
(52) U.S. Cl. ......................... 428/694 TS; 428/694 TC; 428/336; 428/900; 427/131; 204/192.2; 204/192.12
(58) Field of Search .................. 428/900, 694 TS, 428/694 TC, 336; 427/128, 131; 204/192.1, 192.2, 192.12

(56) References Cited

U.S. PATENT DOCUMENTS

| | | | |
|---|---|---|---|
| 4,722,869 A | 2/1988 | Honda et al. | ............... 428/611 |
| 4,743,491 A | 5/1988 | Asada et al. | ................ 428/213 |
| 4,833,020 A | 5/1989 | Shiroishi et al. | ............ 428/336 |
| 5,543,221 A | 8/1996 | Kitakami et al. | |
| 5,981,018 A | * 11/1999 | Lai et al. | ................... 428/65.5 |
| 5,993,956 A | * 11/1999 | Lambeth et al. | ............ 428/332 |
| 6,010,795 A | * 1/2000 | Chen et al. | ................. 428/611 |
| 6,129,981 A | * 10/2000 | Okuyama et al. | ........... 428/332 |
| 6,159,625 A | * 12/2000 | Ueno | ...................... 428/694 T |

FOREIGN PATENT DOCUMENTS

| | | | |
|---|---|---|---|
| JP | 6 3187-416 A | | 1/1987 |
| JP | 11126322 | * | 5/1995 |
| JP | 11106905 | * | 4/1999 |

OTHER PUBLICATIONS

"NiAl Underlayers For CoCrTa Magnetic Thin Films", L. Lee et al., IEEE Transactions on Magnetics, vol. 30, No. 6, Nov. 1994, pp. 3951–3953.

"The role of NiAl underlayers in longitudinal recording media" (abstract), C. Ross et al., Journal of Applied Physics, vol. 81, No. 8, Apr. 15, 1997, p. 4369.

* cited by examiner

*Primary Examiner*—Paul Thibodeau
*Assistant Examiner*—Holly C. Rickman
(74) *Attorney, Agent, or Firm*—McDermott, Will & Emery

(57) ABSTRACT

High areal density magnetic recording media exhibiting high magnetic performance, e.g., narrow PW50, and high OW, and high SNR, are formed with a NiAlRu seedlayer. Embodiments of the present invention include sputter depositing a NiAlRu seedlayer on a non-magnetic substrate and sequentially depositing thereon a Cr or Cr alloy underlayer, e.g., CrMo, CrMn, CrV or CrW, a magnetic layer, e.g., a Co—Cr-containing magnetic alloy layer, and a protective overcoat, e.g., a carbon-containing protective overcoat.

18 Claims, 2 Drawing Sheets

MAGNETIC RECORDING MEDIUM WITH A NIALRU SEEDLAYER

RELATED APPLICATIONS

This application claims priority from Provisional Application Ser. No. 60/101,902 filed on Sept. 25, 1998 entitled: MAGNETIC RECORDING MEDIUM DESIGN CONTAINING A NIALRU SEEDLAYER", the entire disclosure of which is hereby incorporated by reference herein.

TECHNICAL FIELD

The present invention relates to magnetic recording media, such as thin film magnetic recording disks, and to a method of manufacturing the media. The invention has particular applicability to high areal density magnetic recording media exhibiting low noise, low signal modulation, high overwrite and narrow pulse width.

BACKGROUND ART

The increasing demands for higher areal recording density impose increasingly greater demands on thin film magnetic recording media in terms of remanent coercivity (Hr), magnetic remanance (Mr), coercivity squareness (S*), medium noise, i.e., signal-to-noise ratio (SNR), and narrow track recording performance. It is extremely difficult to produce a magnetic recording medium satisfying such demanding requirements.

The linear recording density can be increased by increasing the Hr of the magnetic recording medium while decreasing the medium noise, as by maintaining very fine magnetically non-coupled grains. Medium noise in thin films is a dominant factor restricting increased recording density of high density magnetic hard disk drives, and is attributed primarily to inhomogeneous grain size and intergranular exchange and magnetostatic couplings. Accordingly, in order to increase linear density, medium noise must be minimized by suitable microstructure control.

There are other basic characteristics of magnetic recording media, aside from SNR, which are indicative of recording performance, such as half-amplitude pulse width (PW50), overwrite (OW), and modulation level. A wide PW50 indicates that adjacent bits are crowded together resulting in interference which limits the linear packing density of bits in a given track and, hence, reduces packing density in a given area thereby eliminating the recording capacity of the magnetic recording medium. Accordingly, a narrow PW50 is desirable for high areal recording density.

OW is a measure of the ability of the magnetic recording medium to accommodate overwriting of existing data. In other words, OW is a measure of what remains of a first signal after a second signal, e.g., at a different frequency, has been written over it on the medium. OW is considered low or poor when a significant amount of the first signal remains.

It is extremely difficult to obtain optimum performance from a magnetic recording medium by optimizing each of the PW50, OW, SNR and modulation level, as these performance criteria are interrelated and tend to be offsetting. For example, if coercivity (Hc) is increased to obtain a narrower PW50, OW is typically adversely impacted, as increasing Hc typically degrades OW. A thinner medium having a lower Mr x thickness (Mrt) yields a narrower PW50 and better OW; however, the medium signal is usually reduced as well, which might pose difficulty in recording system design since the fraction of electronic noise of the system increases. Increasing the squareness of the hysteresis loop contributes to a narrower PW50 and better OW; however, noise may increase due to intergranular exchange coupling and magnetostatic interaction. Thus, a formidable challenge is present in optimizing magnetic performance in terms of PW50, OW, SNR and modulation level.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is also recognized that underlayers having a fine grain structure are highly desirable, particularly for growing fine grains of hexagonal close packed (HCP) Co alloys deposited thereon.

It has been reported that nickel-aluminum (NiAl) films exhibit a grain size which is smaller than similarly deposited Cr films, which are the underlayer of choice in conventional magnetic recording media. Li-Lien Lee et al., "NiAl Underlayers For CoCrTa Magnetic Thin Films", IEEE Transactions on Magnetics, Vol. 30, No. 6, pp. 3951–3953, 1994. Accordingly, NiAl thin films are potential candidates as underlayers for magnetic recording media for high density longitudinal magnetic recording. However, it was found that the coercivity of a magnetic recording medium comprising a NiAl underlayer is too low for high density recording, e.g. about 2,000 Oersteds (Oe). The use of a NiAl underlayer is also disclosed by C. A. Ross et al., "The Role Of NiAl Underlayers In Longitudinal Recording Media", J. Appl. Phys. 81(a), P.4369, 1997.

In order to increase Hr, magnetic alloys containing platinum (Pt), such as Co—Cr—Pt—tantalum (Ta) alloys have been employed. Although Pt enhances film Hr, it was found that Pt also increases media noise. Accordingly, it has become increasingly difficult to achieve high areal recording density while simultaneously achieving high SNR and high Hr.

In U.S. Pat. No. 6,010,795, issued to Chen et al., a magnetic recording medium is disclosed comprising a surface oxidized seed layer, e.g. NiP, and sequentially deposited thereon a Cr-containing sub-underlayer, a NiAl or iron aluminum (FeAl) sub-underlayer, a Cr-containing intermediate layer and a magnetic layer.

Kitakami et al., in U.S. Pat. No. 5,543,221, disclose a magnetic recording medium comprising a non-magnetic intermediate layer interposed between a recording layer and a soft magnetic layer, which intermediate layer can contain ruthenium or an alloy, oxide or nitride thereof. Shiroishi et al., in U.S. Pat. No. 4,833,020, disclose a magnetic recording medium comprising a composite underlayer which contain ruthenium and aluminum. Honda et al., in U.S. Pat. No. 4,722,869, disclose a magnetic recording medium containing a columnar crystal grain size control layer on the substrate which can contain ruthenium. Asada et al., in U.S. Pat. No. 4,743,491, disclose a perpendicular magnetic recording medium comprising an electrically conductive underlayer which can contain ruthenium and aluminum. Japanese Patent No. J'63187-416-A discloses a magnetic recording medium comprising a composite underlayer, containing a lower layer and an upper layer which can contain ruthenium.

There exists a need for high areal density magnetic recording media exhibiting high magnetic properties and high SNR. There also exists a need for magnetic recording media exhibiting a narrow PW50, high OW, high SNR and low signal modulation.

DISCLOSURE OF THE INVENTION

An advantage of the present invention is a magnetic recording medium for high areal recording density exhibiting a narrow PW50, high OW, high SNR and low signal modulation.

Another advantage of the present invention is a method of manufacturing a magnetic recording medium suitable for high areal recording density and exhibiting a narrow PW50, high OW, high SNR and low signal modulation.

Additional advantages and features of the present invention will be set forth in part in the description which follows and in part will become apparent to those having ordinary skill in the art upon examination of the following only to be learned from the practice of the present invention. The advantages of the present invention maybe realized and obtained as particularly pointed out in the appended claims.

According to the present invention, the foregoing and other advantages are achieved by a magnetic recording medium comprising a non-magnetic substrate; a nickel-aluminum-ruthenium (NiAlRu) alloy seedlayer on the substrate; an underlayer on the seedlayer; and a magnetic layer on the underlayer.

Another aspect of the present invention is a method of manufacturing a magnetic recording medium, the method comprising sputter depositing a nickel-aluminum-ruthenium (NiAlRu) alloy seedlayer on a non-magnetic substrate; depositing an underlayer containing chromium or a chromium alloy on the seedlayer; and depositing a cobalt alloy magnetic layer on the underlayer.

Embodiments of the present invention include sputter depositing a NiAlRu alloy seedlayer on a non-magnetic substrate, such as an aluminum-magnesium substrate, or a glass or glass ceramic substrate, depositing chromium or a chromium alloy underlayer, such as a chromium-molybdenum underlayer, and depositing a cobalt-chromium magnetic alloy, such as a cobalt-chromium-platinum-tantalum-niobium alloy. Embodiments of the present invention further include depositing the NiAlRu seedlayer at a thickness of about 10 521 to about 2,000 Å, the seedlayer comprising about 40 to about 50 at. % nickel, about 45 to about 55 at. % aluminum and greater than about 0.1 to about 10 at. % ruthenium.

Additional advantages of the present invention will become readily apparent to those skilled in this art from the following detailed description, wherein only the preferred embodiments of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature and not as restrictive.

DESCRIPTION OF THE INVENTION

The present invention provides magnetic recording media suitable for high areal recording density exhibiting high Hr, high SNR, narrow PW50, high OW, low signal modulation and high off-track capacity. The present invention achieves such technological advantages by strategically forming a NiAlRu seedlayer on a non-magnetic substrate. It was found that the use of a NiAlRu seedlayer significantly enhances magnetic performance vis-à-vis a conventional magnetic recording medium having a chromium or chromium alloy underlayer.

Embodiments of the present invention comprise depositing a NiAlRu seedlayer at a thickness of about 10 Å to about 2,000 Å, e.g., about 200 Å to about 600 Å. Embodiments of the present invention further include employing a NiAlRu seedlayer comprising about 40 at. % to about 50 at. % nickel, e.g., about 44 to about 46 at. % nickel, about 45 to about 55 at. % aluminum, e.g., about 50% at. % aluminum, and greater than about 0.1 to about 10 at. % ruthenium, e.g., about 4 to about 6 at. % ruthenium.

Embodiments further include depositing an underlayer containing about 50 to about 100 at. % chromium, i.e., a chromium or chromium alloy underlayer, such as a chromium-molybdenum, chromium-manganese, chromium-vanadium or chromium-tungsten alloy underlayer. A magnetic layer is then deposited on the underlayer, e.g., a cobalt-chromium magnetic alloy layer, such as cobalt-chromium-platinum, cobalt-chromium-tantalum, cobalt-chromium-platinum-tantalum or cobalt-chromium-platinum-tantalum-niobium. The substrate employed in the present invention can be any of various substrates conventionally employed in the manufacture of magnetic recording medium, such as aluminum or an aluminum alloy, e.g., aluminum-magnesium, with or without a nickel-phosphorous plating thereon, a glass, ceramic or glass-ceramic material or graphite. Advantageously, the seedlayer, underlayer, magnetic layer and conventional carbon-containing protective overcoat can be deposited by sputtering, as in a conventional sequential static or in-line sputtering system.

Figure 1:
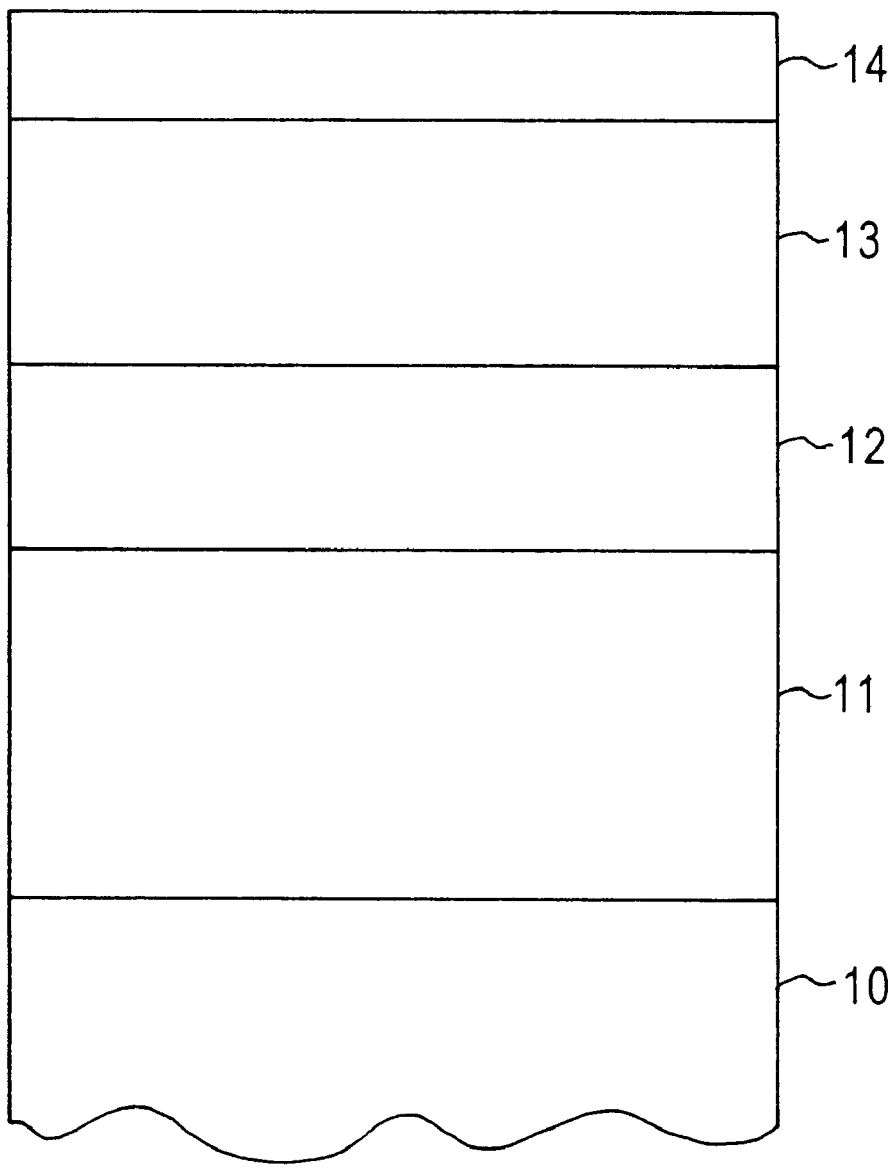
FIG. 1 schematically depicts a magnetic recording medium structure in accordance with an embodiment of the present invention.
Figure 2A:
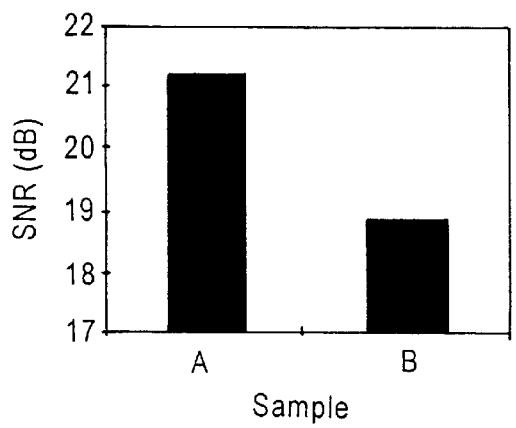
FIGS. 2A, 2B, 2C and 2D show the results of comparison testing between an embodiment of the present invention and a conventional magnetic disc with respect to SNR, PW50, OW and recording signal modulation (MOD), respectively.
Figure 2B:
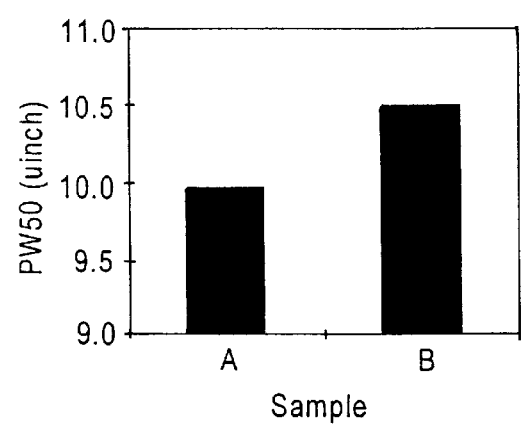
Figure 2C:
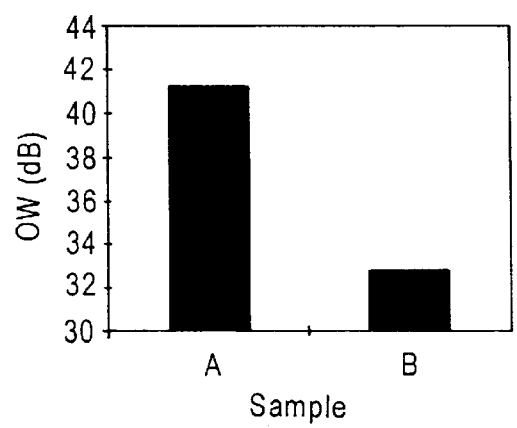
Figure 2D:
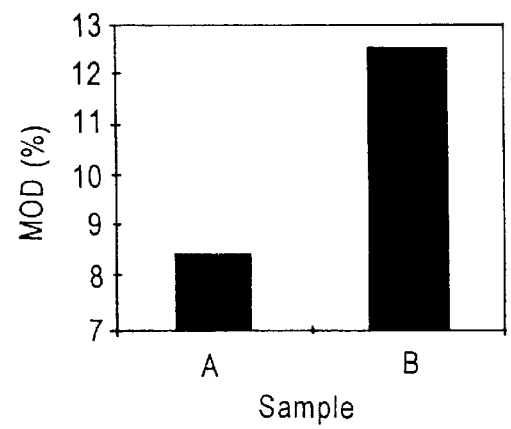

An embodiment of the present invention is schematically illustrated in FIG. 1 and comprises substrate 10, e.g., aluminum-magnesium alloy, or a glass or glass-ceramic substrate and a NiAlRu seedlayer 11 deposited thereon, e.g., a $Ni_{45}Al_{50}Ru_5$ seedlayer. The seedlayer can be sputter deposited employing a well mixed, fine-grain homogeneous target of the same composition as deposited. The deposited seedlayer film will have a fine-grain structure as well, with an average grain size diameter less than about 15 nm and a grain size distribution of about 5 nm to about 20 nm. The NiAlRu films can be sputter deposited in a conventional DC or RF magnetron sputtering apparatus.

Underlayer 12 is then deposited on the NiAlRu seedlayer 11, e.g., a chromium-molybdenum alloy. A magnetic alloy layer 13, e.g., a cobalt-chromium-platinum-tantalum-niobium alloy, is then sputter deposited on underlayer 12, and a conventional carbon-containing protective overcoat 14 deposited on magnetic layer 13. A conventional lubricant topcoat (not shown) is then deposited on the protective overcoat 14. It should be understood that the NiAlRu seedlayer 11, underlayer 12, magnetic layer 13, protective overcoat 14 and lubricant topcoat are sequentially deposited on both sides of substrate 10.

EXAMPLES

An embodiment of the present invention, Sample A, was prepared having a $Ni_{45}Al_{50}Ru_5$/CrMo/CoCrPtTaNb/C film structure. Sample B, representative of a conventional structure, was prepared in a manner similar to that of Sample A except that it did not have the NiAlRu seedlayer and a conventional $CrV_{20}$ underlayer was employed in lieu of the CrMo underlayer. A nickel phosphorous-plated aluminum substrate was employed in both Sample A and Sample B. The films were sputtered in a DC magnetron sputtering system, with a base pressure typically maintained in the range of about 10–7 Torr. The substrate was preheated to over about 100° C., and the sputtering pressure was in the range of about 5 to about 15m Torr. Similar samples were made in a different in-line passby sputtering apparatus and similar results and conclusions were obtained.

The magnetic properties of the media were tested on a non-destructive rotating disk magnetometer. The recording signal and media noise were measured at 270 kfci (kiloflux change per inch) linear density using a Guzik tester with a magnetoresistive (MR) head having a gap length of about 0.54 μm flying at a height of about 1.1 μ inch.

The results of testing are illustrated in FIGS. 2A–2D, showing the SNR, PW50, OW and MOD, respectively, for Sample A and Sample B. Sample A and Sample B exhibited similar Hr, Mrt and S*. However, the recording performance for Sample A was significantly superior to that of Sample B. As shown in FIGS. 2A–2D, Sample A exhibited a higher SNR, narrower PW50, significantly higher OW and lower MOD, respectively, than Sample B.

The exact mechanism involved in achieving improved magnetic properties by virtue of employing a NiAlRu seedlayer is not known with certainty. However, it is believed that the improvements may stem from several mechanisms. It is believed that a (112) film orientation in the NiAlRu seedlayer initiates growth of the chromium or chromium alloy underlayer having a primary (112) orientation, thereby resulting in a primary (1010) surface orientation for the magnetic film, and a magnetic easy-axis in-plane with high magnetic anisotropy. In addition, it is believed that the NiAlRu alloy enables a decrease in the grain size of the magnetic film through epitaxy. Moreover, better lattice matching and, hence, better epitaxial growth and a higher degree of crystallinity and magnetic easy-axis orientation are believed to be achieved.

The magnetic alloys suitable for use in the present invention can comprise any of those conventionally employed in the manufacture of magnetic recording media, such as cobalt-chromium alloys, e.g., cobalt-chromium-platinum, cobalt-chromium-tantalum, cobalt-chromium-platinum-tantalum and cobalt-chromium-platinum-tantalum-niobium alloys. Magnetic recording media in accordance with the present invention can be manufactured in conventional sputtering apparatus, including a DC single disk sputtering apparatus as well as in-line passby systems.

Embodiments of the present invention also include depositing, a thin intermediate magnetic layer of cobalt-chromium-tantalum (CoCrTa) on the underlayer and depositing the magnetic layer on the CoCrTa intermediate layer. The intermediate CoCrTa layer can comprise about 10 to about 40 at. % Cr up to about 6 at. % Ta.

The present invention advantageously provides high areal recording density magnetic recording media exhibiting high SNR, narrow PW50, high OW and low MOD. The present invention is applicable to the production of various types of magnetic recording media, and is not limited to any particular substrate material, underlayer, magnetic layer, protective overcoat or lubricant topcoat.

Only certain embodiments of the present invention and but a few examples of its versatility are shown and described in the present disclosure. It is to be understood that the present invention is capable of use in various other combinations and in environments, and is capable of changes and modifications within the scope of the inventive concept as expressed herein.

What is claimed is:

1. A magnetic recording medium comprising:
    a non-magnetic substrate;
    a nickel-aluminum-ruthenium (NiAlRu) alloy seedlayer directly on the substrate;
    an underlayer, comprising an alloy containing about 50 at. % or more chromium and an element selected from the group consisting of molybdenum, manganese and tungsten, on the seedlayer; and
    a magnetic layer on the underlayer.

2. The magnetic recording medium according to claim 1, wherein the magnetic layer comprises an alloy containing cobalt and chromium.

3. The magnetic recording medium according to claim 2, wherein the magnetic layer comprises a member selected from the group consisting of cobalt-chromium-platinum alloys, cobalt-chromium-tantalum alloys, cobalt-chromium-platinum-tantalum alloys and cobalt-chromium-platinum-tantalum-niobium alloys.

4. The magnetic recording medium according to claim 2, wherein the substrate comprises a member selected from the group consisting of aluminum alloys, glass materials and glass-ceramic materials.

5. The magnetic recording medium according to claim 1, wherein the seedlayer has the thickness of about 10 Å to about 2,000 Å.

6. The magnetic recording medium according to claim 1, wherein the seedlayer comprising:
    about 40 to 50 at. % nickel;
    about 45 to about 55 at. % aluminum; and
    about 0.1 to about 10 at. % ruthenium.

7. The magnetic recording medium according to claim 6, wherein the seedlayer comprises:
    about 44 to about 46 at. % nickel;
    about 50 at. % aluminum; and
    about 4 to about 6 at. % ruthenium.

8. The magnetic recording medium according to claim 7, wherein the seedlayer comprises $Ni_{45}Al_{50}Ru_5$.

9. The magnetic recording medium according to claim 8, comprising:
    a chromium-molybdenum underlayer;
    a cobalt-chromium-platinum-tantalum-niobium magnetic layer; and
    a carbon-containing protective overcoat.

10. The magnetic according medium according to claim 1, comprising:
    a chromium-molybdenum underlayer;
    a cobalt-chromium-platinum-tantalum-niobium magnetic layer.

11. A method of manufacturing recording medium, the method comprising:
    sputter depositing a nickel-aluminum-ruthenium (NiAlRu) alloy seedlayer directly on a non-magnetic substrate;
    depositing an underlayer, comprising an alloy containing about 50 at. % or more chromium and an element selected from the group consisting of molybdenum, manganese and tungsten, on the seedlayer; and
    depositing a cobalt alloy magnetic layer on the underlayer.

12. The method according to claim 11, comprising sputter depositing the NiAlRu alloy seedlayer using a substantially homogeneous target of the NiAlRu alloy at a pressure of about 5 to about 15 m Torr. by DC or RF magnetron sputtering.

13. The method according to claim 12, wherein the deposited NiAlRu film has an average grain size of about 15 nm or less.

14. The method according to claim 11, comprising depositing the seedlayer at a thickness of about 10 Å to about 2,000 Å.

15. The method according to claim 11, comprising depositing a cobalt-chromium alloy magnetic layer.

16. The method according to claim 11, comprising depositing the seedlayer containing:

about 40 to about 50 at. % nickel;

about 45 to about 55 at. % aluminum; and about 0.1 to about 10 at. % ruthenium.

17. The method according to claim 16, comprising depositing the seedlayer containing:

about 44 to about 46 at. % nickel;

about 50 at. % aluminum; and about 4 to about 6 at. % ruthenium.

18. The method according to claim 17, comprising sputter depositing:

a layer of $Ni_{45}Al_{50}Ru_5$ as the seedlayer;

a layer of chromium-molybdenum as the underlayer;

a layer of cobalt-chromium-platinum-tantalum-niobium as the magnetic layer; and a carbon-containing protective overcoat.

* * * * *